Aug. 20, 1929.  W. C. STARKEY  1,725,109

OPEN WOUND SPRING CLUTCH

Filed Jan. 16, 1926

INVENTOR.
WILLIAM CARLETON STARKEY,
BY
ATTORNEY.

Patented Aug. 20, 1929.

1,725,109

UNITED STATES PATENT OFFICE.

WILLIAM CARLETON STARKEY, OF INDIANAPOLIS, INDIANA, ASSIGNOR TO L. G. S. DEVICES CORPORATION, OF INDIANAPOLIS, INDIANA, A CORPORATION OF INDIANA.

OPEN-WOUND SPRING CLUTCH.

Application filed January 16, 1926. Serial No. 81,612.

It is the object of my invention to produce a clutch for operatively connecting two relatively rotatable, co-axial members in such a manner that free relative rotation of the members in one direction will be permitted while relative rotation in the other direction will be prevented or opposed. More specifically, it is the object of my invention to produce a device of this kind which will be sensitive in operation, particularly when the device is designed to slip after a maximum torque has been reached tending to rotate the two members relatively in that direction in which the clutch opposes relative rotation.

I accomplish the above objects by providing the relatively rotatable members with alined axial recesses within which I place an open-wound coil spring which in its free state is somewhat longer than the combined depth of the recesses, and I make this coil spring of such a diameter that it will expand into firm engagement with the walls of its associated recesses when the two members rotate relatively in a direction tending to unwind the spring.

Figure 1:
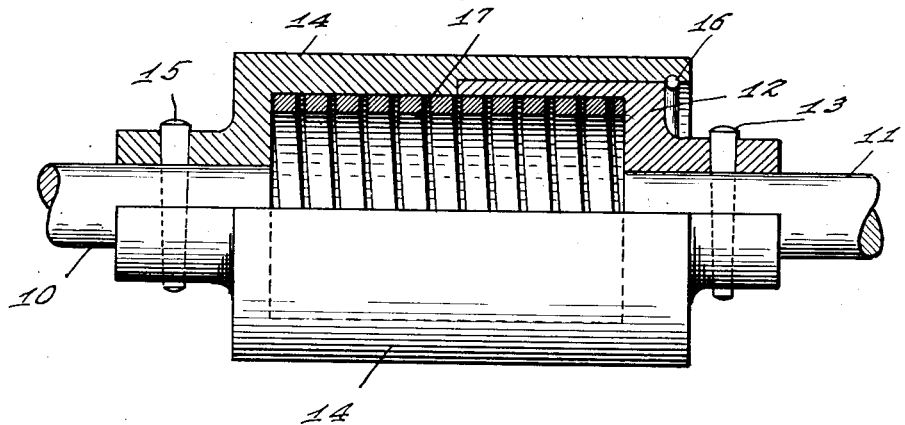
Figure 2:
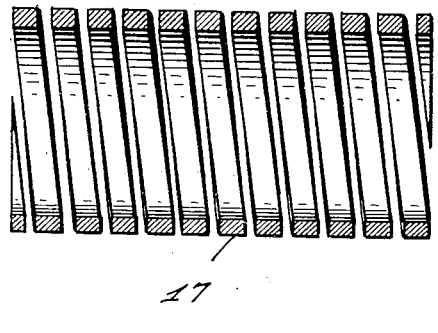

The accompanying drawing illustrates my invention: Fig. 1 is a partial longitudinal section through my improved clutch, and Fig. 2 is a longitudinal section through the coil spring in its free condition.

The drawings illustrate my clutch as operating between two shafts 10 and 11, but it will be evident that it may be used to interconnect any two relatively rotatable, co-axial members. In the device as illustrated, the shaft 11 is provided at its ends with a cup 12 which is rigidly attached to the shaft 11 as by means of the tapered pin 13. The cup 12 extends into the counterbored portion of a second cup 14 which is rigidly mounted on the shaft 10 as by the tapered pin 15. The cup 14 extends over and beyond the cup 12, and is provided on its inner surface with an annular groove adapted to receive a split spring ring 16 which bears against the back of the cup 12 and prevents relative axial movement of the two cups.

Within the cups 12 and 13 I provide a coil spring 17. The spring 17 is an open-wound spring as is evident from the drawing, and this spring preferably has a normal length somewhat greater than the combined depth of the recesses in the cups 12 and 13. The spring is so wound that when in place in the cups its adjacent turns will be spaced apart as is evident from Fig. 1 of the drawing. This spacing is slightly exaggerated in Fig. 1, as in practice it should be only large enough to insure that adjacent turns will not contact.

When in place in the cups, the ends of the spring 17 will bear against the bottoms of the recesses in such cups. The outer surface of the spring may be of such diameter as to bear lightly against the cylinder walls of the recesses in the cups, or the spring can be slightly smaller, even when compressed into the cups, than the diameter of the recesses. The diameter of the spring and the force with which it bears against the walls of the cylinder recesses will depend upon the maximum torque which my clutch is designed to transmit. For the same spring material, the spring will be made to bear with greater force against the walls of its associated recesses when the maximum torque to be transmitted is larger than when such maximum torque is relatively small.

I have illustrated both of the relatively rotatable parts as provided with recesses for the reception of the spring 17, the recesses being of such diameter that the spring can expand into engagement with the recess walls. While this form of interconnecting the spring with each of the cups is preferable, it is only necessary that the spring be so connected to one of the cups as its mode of operative connection to the other cup may be anything desired.

In operation, when the two shafts 10 and 11 rotate relatively in a direction tending to wind the spring 17, the spring will be reduced in diameter and will recede from the walls of its associated recesses to permit free relative rotation of the shafts. Should the two shafts tend to rotate relatively in the opposite direction, such relative rotation will tend to unwind the spring, and will cause the spring to expand into firm engagement with the walls of the recesses in the cups 12 and 14. The maximum torque which the clutch can transmit is limited by the force exerted by the spring 17 on the walls of its associated recesses, and this force can be varied by changing the proportion of the spring.

As the spring is not compressed to its limit when in place in the clutch, there is no friction between adjacent spring turns, and this permits the clutch to be very sensitive in operation. By using a spring which is normally longer than the combined depths of the recesses in which it is located, the axial force between the spring and its associated cups will cause the spring to wind or unwind out of or into engagement with the walls of its associated recesses whether or not the spring is of such an external diameter that its outer surface bears against the cylinder surfaces of the associated recesses.

I claim as my invention:

1. In combination, two relatively rotatable, co-axial members having axial recesses, a coil spring located in said recesses, said spring having adjacent turns spaced apart, and said spring having frictional engagement with both of said members so that when said two members tend to rotate relatively in a direction to unwind said spring, said spring will tend to expand and will clutch said two members together, said spring being arranged to exert an axial pressure on the bottoms of said recesses.

2. combination, two relatively rotatable, co-axial members, one of said members having an axial recess, a coil spring located in said recess, said spring having adjacent turns spaced apart, and said spring having frictional engagement with said recessed member and being operatively connected to the other of said members so that when said two members tend to rotate relatively in a direction to unwind said spring, said spring will tend to expand and will clutch said two members together, said spring being arranged to exert an axial pressure on the bottom of said recess.

3. The combination set forth in claim 2 with the addition that said spring has an external diameter less than that of such recess when said spring is not subjected to any torque.

4. In combination, two relatively rotatable co-axial members, one of said members having an axial recess, a coil spring rotatable relatively to said members and located in said recess, said spring having frictional engagement with said recessed member and being operatively connected to the other of said members so that when said two members tend to rotate relatively in a direction to unwind said spring said spring will tend to expand and will clutch said two members together, said spring being arranged to be axially compressed when in place in said recess in order that it may exert a pressure on the bottom of said recess.

5. A one-way automatic clutch comprising, in combination, co-axial clutch drums, a helical coil spring having its ends surfaced at right angles to its axis and maintained in a state of compression between parallel surfaces provided, respectively, by the clutch drums, the turns of the spring being spaced and providing a cylindrically helical clutch drum engaging surface of substantial width; and means for preventing separation of the clutch drums and maintaining the spring under compression.

6. A one-way automatic clutch comprising, in combination, clutch drums providing co-axial internal clutching surfaces; a single helical coil spring for engaging the clutch surfaces and having its turns spaced and providing a cylindrically helical clutch drum engaging surface of substantial width; surfaces provided by the drums and frictionally engaged by the end of the spring, the spring being normally maintained in a state of compression between the surfaces; and means for preventing separation of the clutch drums and for maintaining the spring compressed.

In witness whereof, I have hereunto set my hand at Indianapolis, Indiana, this 12th day of January, A. D. one thousand nine hundred and twenty six.

WILLIAM CARLETON STARKEY.